United States Patent
Riedl

Patent Number: 5,881,671
Date of Patent: Mar. 16, 1999

[54] CRAWLING INSECT REPELLER

[76] Inventor: James L. Riedl, 2902 S. Whitetail Rd., Gold Canyon, Ariz. 85219

[21] Appl. No.: 14,829

[22] Filed: Jan. 28, 1998

Related U.S. Application Data

[63] Continuation of Ser. No. 777,389, Dec. 27, 1996, abandoned.

[51] Int. Cl.[6] ................................................. A01K 5/01
[52] U.S. Cl. ............................................. 119/61; 43/109
[58] Field of Search ................ 119/51.5, 61; 43/107, 43/109, 121; 52/101

[56] References Cited

U.S. PATENT DOCUMENTS

| | | | |
|---|---|---|---|
| 21,726 | 10/1858 | Shell | 43/121 |
| 52,576 | 2/1866 | Lamb | 43/121 |
| 533,017 | 1/1895 | Peeler | 43/121 |
| 944,568 | 12/1909 | Mercer | 43/121 |
| 1,265,481 | 5/1918 | Mosby | 43/121 |
| 1,558,316 | 10/1925 | Tipple | 119/61 X |
| 2,167,978 | 8/1939 | Jennerich | 43/121 |
| 2,790,417 | 4/1957 | Brembeck | 119/61 |
| 3,441,003 | 4/1969 | Du Mond et al. | 43/121 |
| 3,901,192 | 8/1975 | Adams | 119/61 |
| 4,128,080 | 12/1978 | Haney | 119/61 |
| 4,399,772 | 8/1983 | Salinas | 119/51.5 |
| 4,953,506 | 9/1990 | Sanders | 119/61 |
| 4,966,099 | 10/1990 | Arney | 119/61 |
| 5,042,192 | 8/1991 | Osteen | 43/109 |
| 5,113,798 | 5/1992 | Rera | 119/61 |
| 5,125,363 | 6/1992 | McGaha | 119/51.5 |
| 5,148,626 | 9/1992 | Haake, Sr. | 119/61 |
| 5,165,365 | 11/1992 | Thompson | 119/61 |
| 5,205,242 | 4/1993 | Kasselman | 119/61 |
| 5,253,609 | 10/1993 | Partelow et al. | 119/61 |
| 5,277,149 | 1/1994 | East | 119/51.5 |

*Primary Examiner*—Michael J. Carone
*Assistant Examiner*—James S. Bergin
*Attorney, Agent, or Firm*—Halvorson & Venable, P.C.

[57] ABSTRACT

The present invention is an apparatus that prevents crawling insects such as ants from infesting a pet food dish. The invention accomplishes this task without the use of any chemical pesticides, bait or electronics. The apparatus prevents the ants from detecting the smell of pet food by preventing the smell from reaching a critical portion of the path from the food source, to the ground. The apparatus may also be configured to attach to the bottom of table legs such as those used at a picnic or other outdoor gathering.

10 Claims, 3 Drawing Sheets

CRAWLING INSECT REPELLER

This application is a continuation of application Ser. No. 08/777,389, filed Dec. 27, 1996, and abandoned.

FIELD OF THE INVENTION

The present invention relates to the art of insect repelling devices. The invention has particular reference to a device capable of preventing ants from crawling into a pet food dish, to the surface of a picnic table or other similar item where food may be present. The invention accomplishes this task without the use of any chemical pesticides, bait or electronics.

BACKGROUND OF THE INVENTION AND DESCRIPTION OF PRIOR ART

A problem that has existed for decades is the age old question of how to prevent crawling insects from infesting a food source such as a pet dish, an outdoor cookout or picnic. The most persistent, and usually successful of the crawling insects are ants.

It is well documented that once a single ant makes contact with a food source, it may easily draw an entire community of ants within a matter of minutes. The way that the ant accomplishes this feat is quite simple. When the ant locates a food source, it will return to the physical location of its colony leaving a chemical along the trail back to the colony. The other ants in the colony are then able to return to the location of the food source by following the chemical trail. Within minutes, a pet food dish, or a picnic area can be infested with literally hundreds of ants.

The ants generally will accumulate on or near the food source. However, if some method was available to eliminate the opportunity to reach the food source, the potential for infestation would be minimized. The opportunity for infestation is further minimized if an ant is prevented from leaving its chemical trail directly to a food source.

Many standard crawling insect traps are commercially available and have been disclosed in the prior art. For example, U.S. Pat. No. 2,790,417 issued to Brembeck, U.S. Pat. No. 5,277,149 issued to East, U.S. Pat. No. 3,441,003 issued to Du Mond et al., U.S. Pat. No. 5,253,609 issued to Partelow et al., U.S. Pat. No. 5,165,365 issued to Thompson, U.S. Pat. No. 5,113,798 issued to Rera, U.S. Pat. No. 4,128,080 issued to Haney, U.S. Pat. No. 5,125,363 issued to McGaha and U.S. Pat. No. 4,399,772 issued to Salinas all employ a type of pet feeder device that may prevent crawling insects such as ants and roaches from reaching the food dish. However, each of these patented devices require that a moat containing some liquid be used to prevent the insects from reaching the food source.

U.S. Pat. No. 5,148,626 issued to Haake, Sr. also employs a pet feeder device that may prevent crawling insects such as ants and roaches from reaching a food dish. However, this patented device requires the use of a pesticide that kills the insect as it attempts to climb toward the food source. The use of a pesticide is particularly undesirable where pets are involved due to the toxic effect they may have on the animal should they ingest the pesticide.

U.S. Pat. No. 4,953,506 issued to Sanders also teaches a pet feeder device that may prevent crawling insects such as ants and roaches from reaching a food dish. However, this patented device requires the use of a sticky substance on the top surface of a base portion below the food dish to trap the crawling insects. This patent will trap insects as long as the insects themselves cannot form a physical bridge over the sticky substance. When this occurs, other insects may simply crawl over the top of the trapped insects to reach the food dish.

U.S. Pat. No. 2,167,978 issued to Jennerich, U.S. Pat. No. 1,265,481 issued to Mosby, U.S. Pat. No. 944,568 issued to Mercer, U.S. Pat. No. 52,576 issued to Lamb, U.S. Pat. No. 533,017 issued to Peeler, and U.S. Pat. No. 21,726 issued to Shell, all teach devices devoted to trapping insects. However, the present device is not devoted to trapping or harming any insect. Furthermore, no use of a moat or insecticide is required in the present invention.

U.S. Pat. No. 3,901,192 issued to Adams teaches a bird feeder having a cup like container for the bird seed. However, this patent does not teach the ability to prevent crawling insects from reaching the feeder bowl without a moat or insecticide.

The flexibility and simplicity that prevents crawling insects from accessing pet feeders or picnic tables without the use of a moat or insecticides, is a substantial improvement over the prior art.

SUMMARY OF THE INVENTION

It is an object of the present invention to provide a device for preventing crawling insects from invading or infesting a food source such as a pet feeder or a picnic table.

It is a further object of the present invention for the device to prevent the insects from invading or infesting a food source without the use of a moat.

It is a further object of the present invention for the device to prevent the insects from invading or infesting a food source without the use of harmfull insecticides.

It is a further object of the present invention for the device to prevent the insects from invading or infesting a food source without the possibility of killing the insects.

It is a further object of the present invention to prevent an insect from leaving a chemical trail to a food source.

BRIEF DESCRIPTION OF THE DRAWINGS

The novel features that are considered characteristic of the invention are set forth with particularity in the appended claims. The invention itself, however, both as to its structure and its operation together with the additional object and advantages thereof, will best be understood from the following description of the preferred embodiment of the present invention when read in conjunction with the accompanying drawings wherein:

DESCRIPTION OF PREFERRED EMBODIMENTS

Described below is the preferred embodiment of the present invention. Many of the features of the different embodiments are fabricated in a similar manner. Where variances in the construction of the various embodiments exist, these variations will be discussed together in the same section.

Figure 1:
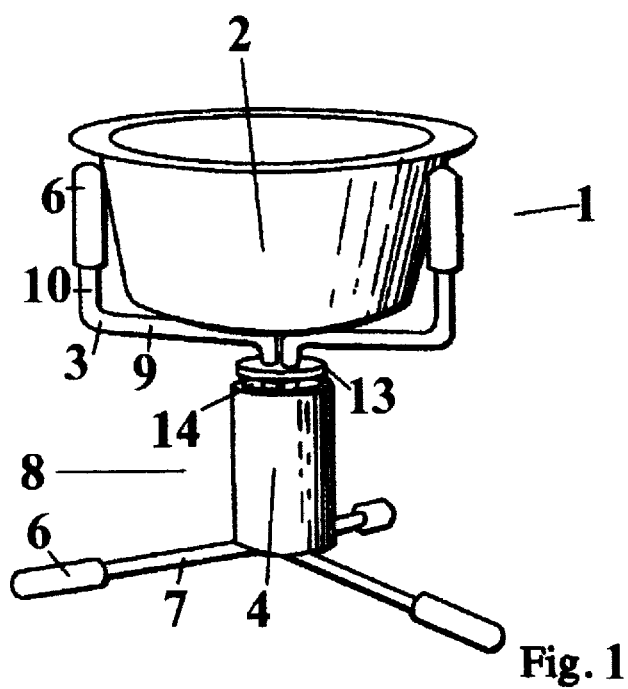
FIG. 1 is a front view of the device showing the pet food dish sitting on the base unit.

Referring to FIG. 1, the figure displays a pet feeder 1 that comprises a food dish 2, that sits on a base unit 8. The base unit is composed of at least three generally u-shaped apparatuses 3, that have a bottom leg 7, a base leg 14, and a top leg 9. The top leg 9, also includes an upward leg 10 that forms an approximate right angle with the top leg 9. Each of the upward leg 10, and bottom leg 7 are covered by a rubber cap 6. The rubber cap 6 is present in order to prevent the metal in the bottom leg 7 and upward leg 10 from wearing away.

The three u-shaped apparatuses 3, are arranged in such a way that the three bottom legs 7 are approximately 120 degrees apart. This is done in order to make the base unit 8 stable, thereby preventing the base unit 8 from falling on its side when the pet dish 2 sits within the top legs 9 of the base unit 8.

Figure 3:
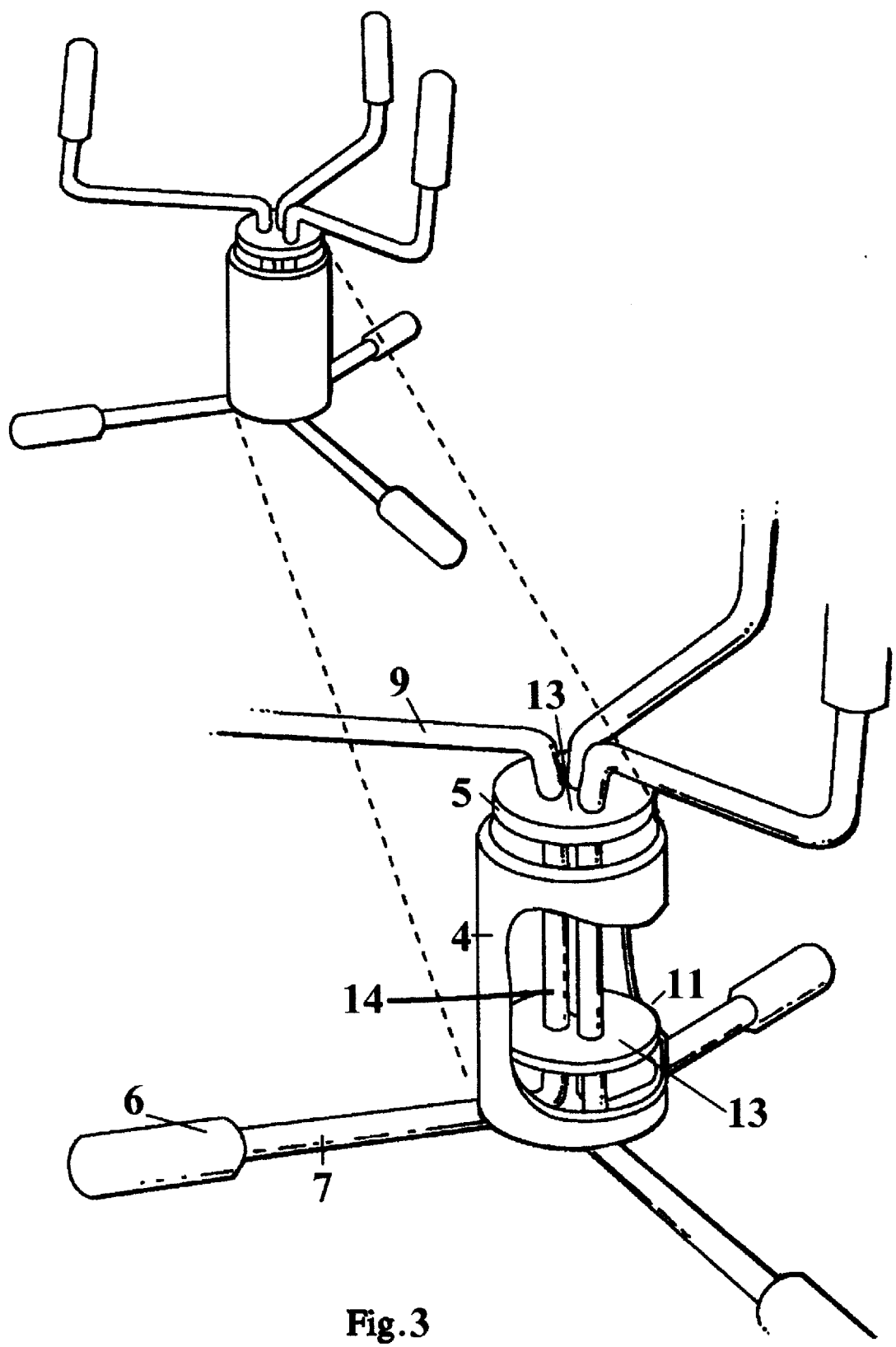
FIG. 3 is a cross sectional view of the device showing the inside of the base unit and how the unit is connected together.

The three u-shaped apparatuses 3, are held together by two circular disks 5 and 11 respectively as shown in FIG. 3. Each of the circular disks 5 and 11 respectively contain three holes 13. The circular disk 5 is positioned at the top of the base legs 14 of the u-shaped apparatuses 3, while the circular disk 11 is positioned at the bottom of the base legs 14 of the u-shaped apparatuses 3. Each of the base legs 14 pierce the circular disks 5 and 11 respectively through each of the holes 13 as shown in FIG. 3. The circular disks 5 and 11 are arranged such that they are parallel to each other. A hollow cylindrical tube 4 rests on the bottom legs 7 of the u-shaped apparatuses 3 and encircles a substantial portion of the base legs 14. The tube 4 must fit tightly around the circular disk 11 such that no crawling insect may pass below or above the circular disk 11. The top of the tube 4 must not cover the circular disk 5 and must maintain a vertical space between the top of the tube 4 and the circular disk 5 such that no crawling insect could reach the circular disk 5 from the top of the tube 4.

Figure 2:
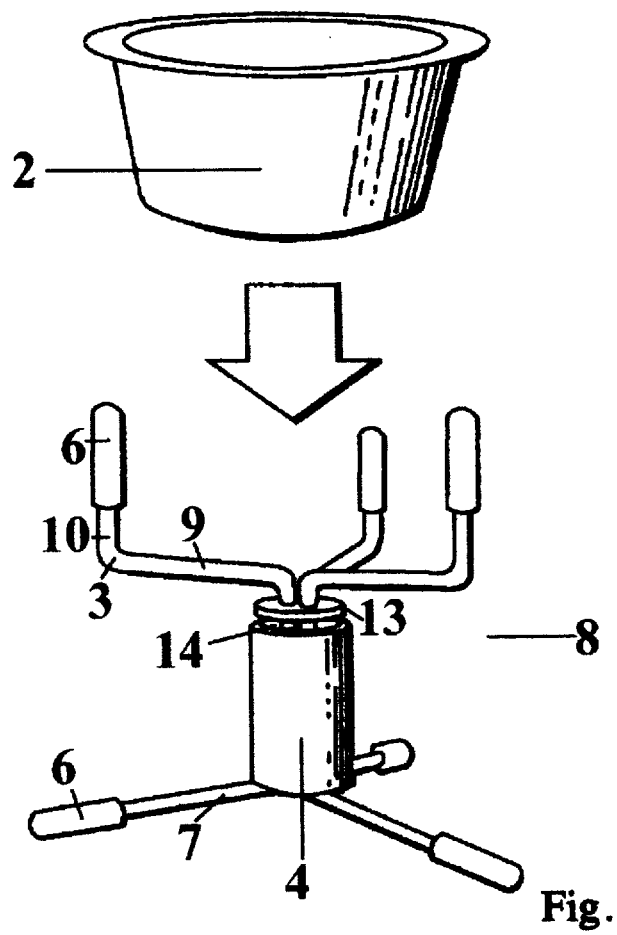
FIG. 2 illustrates a front view of the device showing the pet food dish as it is properly inserted into the top of the base unit.

Referring to FIG. 2, the figure shows the food dish 2 being fitted into the base unit 8 sitting on the top legs 9 of the u-shaped apparatuses 3 and fitting tightly within the upward legs 10.

Figure 4:
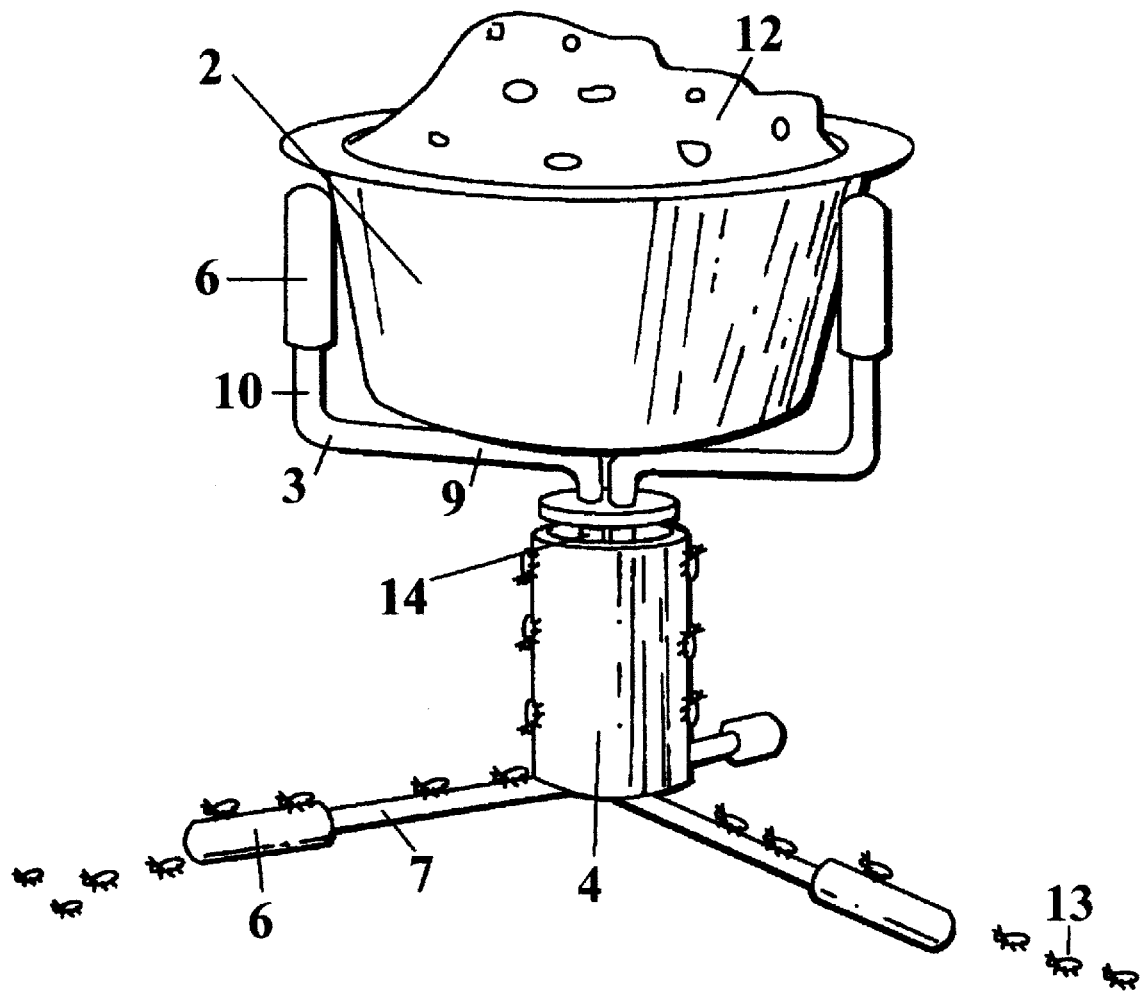
FIG. 4 is a front view of the device in actual use showing the general path of insects that will attempt to reach the food dish that resides on top of the base unit.

Referring to FIG. 4, the figure shows the pet feeder 1 in actual use. Pet food 12 is placed in the food dish 2. As previously discussed, crawling insects such as ants on the scent of the pet food 12 to locate its origin. The scent of the pet food 12 can be be detected by crawling insects 13 such as ants only through air particles. When the ants 13 detect the scent of the pet food, they will generally move in the direction that the scent becomes stronger.

When the ants 13 move in the direction of the pet food, they will leave behind a chemical trail that the other ants will follow. The pet food scent generally remains on the outside of the food dish 2, and along the outside of the base unit 8. The pet food scent will remain outside of the tube 4. Because the pet food scent remains outside of the tube 4, the ants 13 will not follow a path from the top side of the tube 4, to the circular disk 5.

The ants 13, will follow the scent along the bottom legs 7 of the u-shaped apparatus 3, up the outer surface of the tube 4. When the ants 13 reach the top of the tube 4, they will generally try to enter the inner portion of the tube 4. However, when the ants 13 begin moving within, and along the inner surface of the tube 4, the ants are unable to detect any trace of the pet food 12. Because the ants 13 are unable to detect the pet food 12 while in the enclosed portion of the tube 4, they will have no inclination to go inside the tube 4. In general, the ants 13 will circle the rim of tube 4 encountering their chemical trail and retrace their chemical trails left behind where they entered from the top of the tube 4, and will go back to a location outside of the tube 4 where they are able to detect the food source 12.

In order to assure that the smell of the food source 12 does not enter the enclosed portion of the tube 4, it is imperative that the ratio of the height of the tube 4, to the diameter of the circular disk 5, be greater than or approximately equal to 3:1. Additionally, the thickness of the wall of the tube 4 is approximately no thicker than the width of the body of a common ant. This reduces the number of ants that can remain on the rim of tube 4. Furthermore, the diameter of the disk 5 should remain as wide as the inner diameter of the tube 4.

It is understood that those skilled in the art may conceive modifications and/or variations to the specific embodiments shown and described herein. Any such modifications or variations which fall within the purview of this description are intended to be included therein as well. It is understood that the description herein in intended to be illustrative only and is not intended to be limiting. Rather, the scope of the invention described herein is limited only by the claims appended hereto.

What is claimed is:

1. An apparatus capable of preventing crawling insects from infesting a food source without the use of insecticides or liquid materials comprising:

A. a food receptacle,
B. a platform, said platform further comprising,
   a. a bottom side,
      (1) said bottom side including a base capable of supporting the platform on a flat surface,
   b. a top side,
   c. a middle portion, said middle portion further comprising,
      (1) a leg having a top portion and a bottom portioned
      (2) a hollow tube having,
         i. an inner surface,
         ii. an outer surface,
         iii. a top portion,
         iv. a bottom portion,
      (3) a first flange, said first flange fitting securely around the entire inner surface of the bottom portion of said hollow tube,
      (4) a second flange having substantially the same shape as said first flange,
      (5) the first flange attaches the bottom portion of said hollow tube to the leg of the middle portion of said platform,
      (6) said first flange is connected to the bottom portion of said leg and said second flange is connected to the top portion of said leg such that said first and second flanges are parallel to each other,
   d. the top side of said platform is fixedly connected to said second flange,
   e. said food receptacle being removable affixed to the top of said platform,
   f. said second flange is positioned above the top side of said hollow tube such that a crawling insect such as an ant could not crawl directly from the top side of said hollow tube to said second flange.

2. The apparatus of claim 1 wherein the ratio of the height of said hollow tube to the diameter of said second flange is approximately greater than or equal to three to one.

3. The apparatus of claim 1 wherein said hollow tube has a cylindrical shape.

4. The apparatus of claim 1 wherein said first and second flanges have a circular disk shape.

5. The apparatus of claim 1 wherein the base of the bottom side of said platform consists of at least one member, said at least one member contacting the bottom portion of said hollow tube.

6. An apparatus capable of preventing crawling insects from infesting a food source without the use of insecticides or liquid materials comprising:

A. a platform, said platform further comprising,
   a. a bottom side,
      (1) said bottom side including a base capable of supporting the platform on a flat surface,
   b. a top side, said top side capable of being secured to a table leg,
   c. a middle portion, said middle portion further comprising,
      (1) at least one leg having a top portion and a bottom portion,
      (2) a hollow tube having,
         i. an inner surface,
         ii. an outer surface,
         iii. a top portion,
         iv. a bottom portion,
      (3) a first flange, said first flange fitting securely around the entire inner surface of the bottom portion of said hollow tube,
      (4) a second flange having substantially the same shape as said first flange,
      (5) the first flange attaches the bottom portion of said hollow tube to the at least are leg of the middle portion of said platform,
      (6) said first flange is connected to the bottom portion of said at least one leg and said second flange is connected to the top portion of said at least one leg such that said first and second flanges are parallel to each other,
   d. the top side of said platform is fixedly connected to said second flange,
   e. said second flange is positioned above the top portion of said hollow tube such that a crawling insect such as an ant could not crawl directly from the top side of said hollow tube to said second flange.

7. The apparatus of claim 6 wherein the ratio of the height of said hollow tube to the diameter of said second flange is approximately greater than or equal to three to one.

8. The apparatus of claim 6 wherein said hollow tube has a cylindrical shape.

9. The apparatus of claim 6 wherein said first and second flanges have a circular disk shape.

10. The apparatus of claim 6 wherein the base of the bottom side of said platform consists of at least one member.

\* \* \* \* \*